Figure 1:
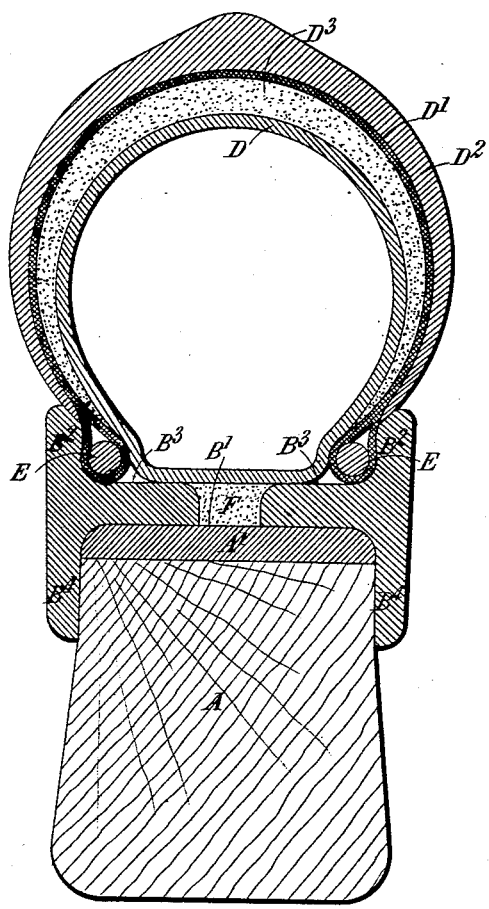

(No Model.) 2 Sheets—Sheet 1.

C. K. WELCH.
PNEUMATIC TIRE FOR VEHICLE WHEELS.

No. 564,808. Patented July 28, 1896.

(No Model.) 2 Sheets—Sheet 2.
C. K. WELCH.
PNEUMATIC TIRE FOR VEHICLE WHEELS.
No. 564,808. Patented July 28, 1896.
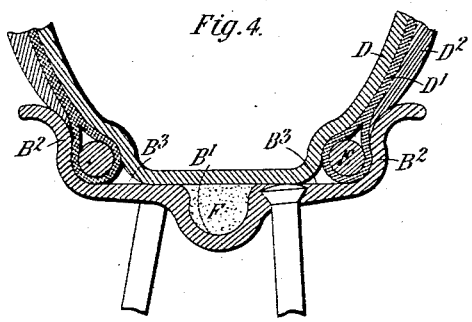
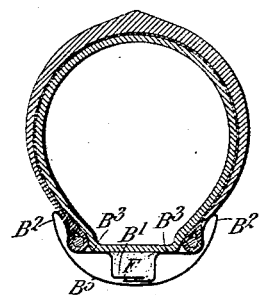
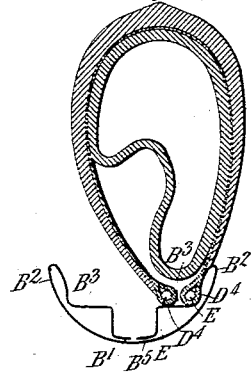

UNITED STATES PATENT OFFICE.

CHARLES KINGSTON WELCH, OF COVENTRY, ENGLAND, ASSIGNOR TO THE PNEUMATIC TYRE AND BOOTH'S CYCLE AGENCY, LIMITED, OF DUBLIN, IRELAND.

PNEUMATIC TIRE FOR VEHICLE-WHEELS.

SPECIFICATION forming part of Letters Patent No. 564,808, dated July 28, 1896.

Application filed April 25, 1893. Serial No. 471,806. (No model.) Patented in England December 9, 1892, No. 22,669; in France March 31, 1893, No. 229,067; in Belgium April 1, 1893, No. 104,143; in Germany April 8, 1893, No. 77,403; in Denmark April 21, 1893, No. 192; in Canada June 5, 1893, No. 43,133; in Switzerland August 31, 1894, No. 9,201; in Italy September 3, 1894, XXIX, 37,129, and LXXII, 497; in Spain October 19, 1894, No. 16,257; in Victoria November 28, 1894, No. 11,855; in New South Wales November 30, 1894, No. 5,484; in New Zealand November 30, 1894, No. 7,363; in South Australia January 4, 1895, No. 2,848; in Austria February 13, 1895, No. 45/498, and in Queensland December 21, 1895, No. 2,862.

*To all whom it may concern:*

Be it known that I, CHARLES KINGSTON WELCH, engineer, a subject of the Queen of Great Britain, and a resident of Coventry, England, have invented certain new and useful Improvements Relating to Wheels for Velocipedes and other Vehicles, (for which I have obtained Letters Patent in Great Britain, No. 22,669, dated December 9, 1892; in Belgium, No. 104,143, dated April 1, 1893; in France, No. 229,067, dated March 31, 1893; in Canada, No. 43,133, dated June 5, 1893; in Germany, No. 77,403, dated April 8, 1893; in Denmark, No. 192, dated April 21, 1893; in Austria, No. 45/498, dated February 13, 1895; in Italy, XXIX, 37,129, and LXXII, 497, dated September 3, 1894; in Spain, No. 16,257, dated October 19, 1894; in Switzerland, provisional No. 9,201, dated August 31, 1894; in Victoria, No. 11,855, dated November 28, 1894; in New South Wales, No. 5,484, dated November 30, 1894; in South Australia, No. 2,848, dated January 4, 1895; in Queensland, No. 2,862, dated December 21, 1895, and in New Zealand, No. 7,363, dated November 30, 1894,) of which the following is a specification, reference being had to the accompanying drawings.

The invention, subject of my present application for patent, is an improvement in pneumatic tires for vehicle-wheels.

The invention is more particularly applicable to detachable tires of the type now commonly known in all parts of the world as "Dunlop detachable tires," and which usually comprise a cover the edges of which are made inextensible, an inner inflatable tube or core, and a rim the edges of which are of greater circumference than the inextensible edges of the cover. These tires are almost invariably used in conjunction with the rim of U shape or crescent-section, the groove in which is of sufficient depth to permit the tire-cover to be worked onto or off from the rim, when deflated, without varying the circumference of the inextensible edges.

The object of my present invention is twofold, first, to provide a ready means for taking from or imparting to the tire and rim at will this feature of detachability, so that the possibility of accidental displacement of the tire after being once placed in position may be prevented, and, second, to provide a readier and more certain means for the alinement of the cover, whereby the latter, by the mere act of placing it in the rim, is brought before inflation into practical concentricity with the rim.

The first object I secure by placing in the bottom of the groove of the rim, below the level of the edges of the cover, and after the latter has been worked over onto the rim, a removable filling, which temporarily, or while the tire is in use, acts to increase the circumference or lessen the depth of the groove in which the tire is seated, and the second object I secure by making the main channel or groove which constitutes the seat for the tire with a broad approximately flat bottom of approximately the circumference of the edges of the cover, but with a comparatively narrow depression or supplemental groove which permits the cover to be put on and taken off, except when a filling of suitable material is placed in it.

I have shown in the drawings hereto annexed types of my improvement in what I regard as the best and most practicable form.

Figures 1 to 4 are sectional views showing wheel-rims for heavier vehicles, such as cabs and the like, provided with tires. Figs. 5 and 6 are similar views of wheels adapted for use with lighter vehicles, such as bicycles.

Referring to Figs. 1 to 4, A designates the wooden rim or felly of the wheel, which may, if desired, be furnished with an ordinary metal tire A', as shown in Fig. 1. B is the rim for receiving the pneumatic tire, in which is formed a depression or supplemental channel or groove B'. The bottom of the rim B, that is to say, the portion between the side flanges B², is substantially cylindrical and of approximately—though always smaller—the circumference of the inextensible edges of the tire-cover.

Figure 2:
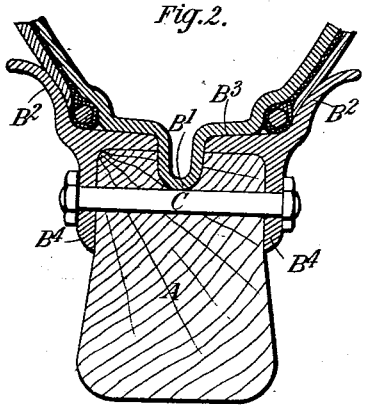
Figure 3:
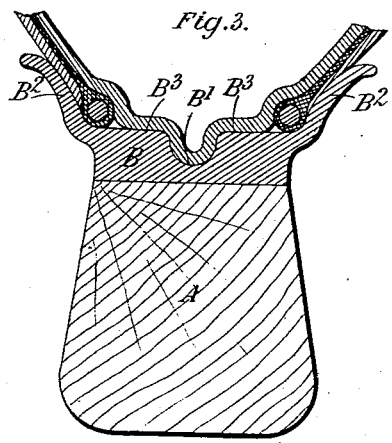

The side flanges may be at any suitable angle with the cylindrical part, and I prefer to round their edges or bend them over, as shown in Figs. 2, 3, and 4, to prevent any possibility of the tire being cut or injured thereby.

I sometimes make the rim in one piece, as shown in Figs. 3 and 4, the former of which shows a rim applied to a wooden felly in place of an ordinary cylindrical iron tire and the latter of which shows a solid rim suitable for a sulky or other light vehicle. I sometimes, however, make the rim in two pieces, as shown in Figs. 1 and 2, in which case I preferably provide the separate parts with inwardly-projecting flanges B⁴, by means of which said parts may be secured on the felly by transverse bolts, as shown at C, Fig. 2, or by screws or other suitable means. In this case the depression B' is formed by leaving a gap between the cylindrical portions of the two pieces forming the rim.

It is obvious that a rim formed as shown in Fig. 4, but lighter and thinner in section, can be advantageously used for velocipede and other light wheels.

D is the air-tube of the pneumatic tire. D' is the canvas jacket, having endless cores E placed in the edges thereof, and D² is the outer cover of the tire.

I sometimes insert between the air-tube and the canvas jacket of the tire a thick padding of felt or other suitable material, as shown at D³, Fig. 1, to protect the air-tube from nails, thorns, or the like, which might pass through a thin cover and so puncture the air-tube.

The groove B' of the rim is filled with a suitable filling F when the tire is in its place on the rim, as will be hereinafter more particularly explained.

In Figs. 5 and 6 I have shown different methods of making hollow rims having the same contour on the side remote from the hub as those hereinabove described, and which are more especially suitable for velocipedes and similar wheels. In Fig. 5 a single strip of metal is bent so that the part adjacent to one edge thereof forms the bottom of the groove or depression B', and the remaining part of the said strip forms in succession one-half of the cylindrical surface B³, and one flange B², the curved inner face of the rim B⁵, the other flange B² the remaining half of the cylindrical surface B³, and the edge thereof is brazed, grooved, or otherwise secured to the first edge at the bottom of the depression B'. I sometimes braze or otherwise secure the two edges together and also to the curved inner face B⁵ of the rim at the bottom of the depression.

In Fig. 6 the rim is constructed in the same manner as hereinbefore described with reference to Fig. 5, but the edges of the strip meet at the bottom of the groove or depression B' and form a butt-joint instead of a lap-joint, as shown in Fig. 5.

The groove or depression in my improved rim is provided in order that the edges of the tire-cover may be inserted therein at one side of the wheel to enable the tire to assume a position eccentric to the said wheel, so that the said tire may be very easily moved over the opposite side of the wheel and into place thereon. It has hitherto been customary to make the whole rim of U-section or of similar section for a like purpose, but it occasionally happens through the carelessness of the operator that the tire assumes a position eccentric to the wheel after it has been secured thereon.

It is an important feature of my invention that I prevent the assumption by the tire of such a position by forming the rim of the shape hereinbefore described, and further by placing in the aforesaid groove or depression after the tire has been placed upon the rim, a readily-removable filling, as shown in Figs. 1, 4, and 5, for instance, of the drawings. I do this in the manner following, that is to say: after the tire has been placed on the rim and before the air-tube has been fully inflated I force both edges D⁴ of the tire to one side of the rim, as shown in the sectional view Fig. 6. I then place in the groove B' a filling F, composed of a textile fabric, felt, a strip or strips of india-rubber, or other suitable material, so arranged that the said groove or depression is filled or nearly filled to the level of the cylindrical parts B³ of the rim. No movement of the edges of the outer cover can then cause the said covering to become eccentric to the wheel to form an untrue tire. Neither can the tire leave the rim in case of deflation until the filling has been removed. The filling is sometimes attached to the valve or to the ring by one or both of its ends for convenience in placing the same in the groove.

The air-valve through which the tube is inflated projects through an orifice in the bottom of the groove of the rim. To prevent the shell or body of the said valve from turning, I provide suitable projections thereon, which engage with the aforesaid groove or depression, so that the said shell or body cannot rotate, or I depress into the said groove suitable portions of the washer which is usually fitted to the said shell or body of the valve.

The inextensible cores which I provide, as aforesaid, for securing the tire to the rim I preferably form of wire or of wire covered with india-rubber or other suitable material, or as an alternative I construct them of cord or of tightly-rolled textile fabric. For example I sometimes roll up the edges of the canvas jacket which usually lines the outer covering, so as to form the said inextensible cores.

Having now described my invention, what I claim is—

1. The combination with a tire having inextensible edges of a rim having an exterior channel or groove forming a seat for the tire and of a depth which permits the tire to be worked over into its seat, and a filling for the bottom of the groove, as set forth.

2. The combination with a wheel-rim having side flanges and a depression or groove in the face of the rim, an inflatable tube, a cover for the same having non-extensible edges, and a filling for the groove or depression.

3. The combination of a pneumatic tire having inextensible edges, and a wheel-rim having a substantially flat exterior surface with flanges at its sides, and a depression or groove in the flat portion and a filling for said groove, as set forth.

4. The combination of a felly of a wheel, a rim formed in two parts each having an approximately cylindrical portion and an outwardly-extending flange; the said parts of the rim being secured on the felly with an annular space between said parts, said space forming a depression or groove in the rim, a filling for said depression, and a pneumatic tire having endless inextensible cores at its edges; substantially as described.

In witness whereof I have hereunto set my hand this 27th day of March, 1893.

CHARLES KINGSTON WELCH.

Witnesses:
THOMAS MARSTON,
GEORGE WYATT.